United States Patent
Ljung et al.

(10) Patent No.: US 8,537,759 B2
(45) Date of Patent: Sep. 17, 2013

(54) POSITION ADJUSTED GUARD TIME INTERVAL FOR OFDM-COMMUNICATIONS SYSTEM

(75) Inventors: Rickard Ljung, Helsingborg (SE); Peter Karlsson, Lund (SE)

(73) Assignee: Teliasonera AB, Farsta (SE)

( * ) Notice: Subject to any disclaimer, the term of this patent is extended or adjusted under 35 U.S.C. 154(b) by 821 days.

(21) Appl. No.: 10/549,846

(22) PCT Filed: Mar. 17, 2004

(86) PCT No.: PCT/SE2004/000390
§ 371 (c)(1),
(2), (4) Date: Nov. 29, 2006

(87) PCT Pub. No.: WO2004/086711
PCT Pub. Date: Oct. 7, 2004

(65) Prior Publication Data
US 2007/0159957 A1 Jul. 12, 2007

(30) Foreign Application Priority Data
Mar. 25, 2003 (SE) .................................... 0300824

(51) Int. Cl.
*H04W 4/00* (2009.01)
(52) U.S. Cl.
USPC ........... 370/329; 370/328; 375/346; 375/348; 455/507; 455/509

(58) Field of Classification Search
USPC ............... 370/210, 310, 312, 328, 329, 330, 370/350, 432, 436, 478, 509–514; 375/137, 375/140, 143, 152, 327, 344, 362, 365, 368, 375/373, 376; 455/75, 525
See application file for complete search history.

(56) References Cited

U.S. PATENT DOCUMENTS

| 6,373,861 B1 * | 4/2002 | Lee ............................. 370/503 |
| 6,714,511 B1 * | 3/2004 | Sudo et al. .................. 370/208 |

(Continued)

FOREIGN PATENT DOCUMENTS

| EP | 1 014 639 | 6/2000 |
| JP | 10-308716 | 11/1998 |
| JP | 2001-069110 | 3/2001 |
| SE | 504897 C2 * | 5/1997 |

OTHER PUBLICATIONS

Lee, Donghoon et al., "Coarse Symbol Synchronization Algorithms for OFDM Systems in Multipath Channels," IEEE Communications Letters, Oct. 2002, vol. 6, iss. 10, pp. 446-448.*

(Continued)

*Primary Examiner* — Donald Mills
(74) *Attorney, Agent, or Firm* — Oblon, Spivak, McClelland, Maier & Neustadt, L.L.P.

(57) ABSTRACT

A device and a method within a communication system where at least some part of the transmission is executed by means of radio waves, and where symbols are transmitted by means of Orthogonal Frequency Divisional Multiplexing, so called OFDM-technology, between a transmitting unit and a receiving unit, at which the symbol transmission is executed over a transmission channel in blocks of binary digits with a guard interval GI between said blocks, where transmitting unit is equipped with means to control the length of the guard internal (GI) with regard to the physical condition for/of the transmission channel, so that the guard interval can be reduced without the disturbance susceptibility being increased, but instead increasing the capacity/throughput of the transmission channel by the time that is set free/made available being used to transmit information. One embodiment of the invention includes a guard interval adjustment unit connected to other OFDM-equipment in transmitting and/or receiving unit.

15 Claims, 6 Drawing Sheets

(56) References Cited

U.S. PATENT DOCUMENTS

| | | | |
|---|---|---|---|
| 6,850,498 B2 * | 2/2005 | Heath et al. | 370/328 |
| 6,885,630 B2 * | 4/2005 | Kostic et al. | 370/203 |
| 6,922,445 B1 * | 7/2005 | Sampath et al. | 375/267 |
| 7,336,598 B2 * | 2/2008 | Kakura | 370/208 |
| 7,639,986 B2 * | 12/2009 | Vincent | 455/63.1 |
| 7,936,739 B2 * | 5/2011 | Goto et al. | 370/342 |
| 2004/0224691 A1 * | 11/2004 | Hadad | 455/442 |
| 2005/0286449 A1 * | 12/2005 | Seo et al. | 370/280 |
| 2007/0104129 A1 * | 5/2007 | Yang et al. | 370/329 |

OTHER PUBLICATIONS

Tonello et al., "Analysis of the Uplink of an Asynchronous Multi-user DMT OFDMA System Impaired by Time Offsets, Frequency Offsets, and Multi-path Fading", $52^{nd}$ Vehicular Technology Conference, vol. 3, pp. 1094-1099 (2000).

Baum, "A Synchronous Coherent OFDM Air Interface Concept for High Data Rate Cellular Systems", $48^{th}$ IEEE Vehicular Technology Conference, vol. 3, pp. 2222-2226 (1998).

\* cited by examiner

Place/location 1

A1　　　　　A2

Place/location 2

B1　　B2

POSITION ADJUSTED GUARD TIME INTERVAL FOR OFDM-COMMUNICATIONS SYSTEM

BACKGROUND OF THE INVENTION

1. Technical Field

The present invention relates to a transmission method and a transmission device, and a reception method and a reception device, and a system using them. More particularly is related to such ones within communications systems which are using OFDM (Orthogonal Frequency Divisional Multiplexing).

2. Prior Art

An information transmission system generally transmits symbols, where each symbol for instance can be a sequence of ones and zeros in succession over a transmission channel, and there occupies a frequency band which of necessity must be wider/larger than the inverse of the time length of a symbol.

When the transmission speed is increased it finally will be impossible to guarantee that the transmission channel retains identical amplitude and phase characteristics over the whole frequency range which constitutes the pass band. These in this way developed distortions in the channel give rise to interference between symbols, which interference can be fought against by means of an equalizing device, a so called equalizer. Such systems, however, are rather complex.

One technology to handle/manage this problem includes that the signal which shall be transmitted is spread/distributed over a large number of carriers in a parallel way, individually modulated with/by low speed. Because the speed is low, the pass band width which is needed is smaller, and therefore it is more probable that amplitude and phase characteristics will be identical for all frequencies which constitute this band. This technology is known to the expert as "Orthogonal Frequency Divisional Multiplexing" or OFDM. Frequency spectra of the signals which modulate the carriers overlap in such a way that they fulfill the conditions for orthogonality, which makes elimination of interference between modulated sub-carriers possible and also makes it possible to achieve much larger spectral benefit.

The space between two adjacent sub-carriers corresponds to the inverse of the time length of a symbol.

The OFDM-modulation is usually incorporated with a Fourier-transform, so that it can be implemented by means of FTT (Fast Fourier Transform). The main steps to implement transmission of a message by means of OFDM-modulation is specified below.

First of all the binary data which constitute the message which shall be transmitted in data blocks are grouped. Each one of these blocks is transmitted independent of each other and constitutes, after base band modulation, an OFDM-signal. In each data block also the binary digits are grouped in subset. Each subset after that is subject to a "bijective mapping" over a discrete amount of points in the Fresnel-space, where each point represents a possible phase and amplitude. If, for instance, a message consisting of the following series of bits (00001110010001111000 . . . ) is considered, it will be possible to from that extract a block of 16 bits 0000111001000111, with which are associated, by mapping, the following amount of points in the complex plane:

$1+j, 1+j, -1-j, 1-j, -1+j, 1+j, -1+j, -1-j$.

This consequently gives an amount consisting of eight complex elements, which define a vector V.

An inverse discrete Fourier Transform with a matrix A then is allowed to be active/influence on the vectors V which have been obtained from the original message, which gives rise to an OFDM-signal consisting of a series of complex amplitudes.

Each transmitted/transferred symbol then is received, after having passed the transmission channel, by a demodulator, from which there is extracted a vector V' which holds complex elements, by multiplying the amplitudes which describe the symbol by/with a direct discrete Fourier-transform matrix A' so that $A*A'=I$, where I indicates the unit matrix.

The use of a decision criterion based on "Maximum likelihood" on the real part and on the imaginary part of each vector V' makes regain of the original symbol sequence possible and further reconstruction of the to that associated binary elements.

The different symbols in each block are linked up due to the linear combination which is obtained by multiplying the elements in the transmitted vector V by the inverse discrete Fourier-transform matrix A. This linear combination guarantees a certain degree of hardiness and protects the symbols against interference between complex symbols within one and the same OFDM-symbol.

On the other hand, this protection/guard effect does not extend from one OFDM-symbol to another, that is, not from one block to another.

In order to prevent interference between blocks, it is known that a technology can be used which includes to arrange a time period of silence or non-transmission, also called guard (time) interval, between to successive symbols.

In prior art, however, the guard interval preceding current symbol is decided pragmatically, usually after an evaluation by an expert, of the time period which is necessary to attenuate the echo of the transmission of preceding OFDM-symbol.

Some variants including adjustment of the guard interval are also described below.

U.S. Pat. No. 6,115,354-A shows a method which adapts the "guard intervals for the OFDM symbols" to those differences in delay which exist in the network. The first guard interval for a frame, however, is adjusted to "worst case" (see column 2, line 9-column 3, line 9). According to this document, the flexibility of the guard interval results in that the OFDM-system can be optimized both from implementation and network planning perspective (see column 3, lines 36-40).

U.S. Pat. No. 6,175,550-B1 shows an OFDM-system in which a "guard time interval" is adjusted dynamically depending on the communication conditions in the environment (see column 3, lines 3-65), column 6, lines 24-32, and independent patent claims).

EP-1065855-A1 shows adjustment of "cyclic extensions" in an OFDM-system. The length of the cyclic extension is adjusted to the delays which are existing at/in the channel. (See abstract)

WO97/30531-A1 says that a "guard space" can be varied so that a minimal guard space is used (see patent claims).

EP-1061687-A1 shows automatic adjustment of "guard interval" depending on the quality of received signal.

EP-1014639-A2 shows an OFDM-transmitter/receiver for which an optimal selection of guard interval is decided.

BRIEF SUMMARY OF THE INTENTION

At construction of a communications system it is in most cases adjusted to a "worst case". This results in that in all other cases than the worst possible, capacity will be wasted. This invention solves a large part of above mentioned waste of/for an OFDM-system, where the capacity goes down proportionally with the guard interval against the time delay of the channel, "Guard Interval GI". The problem is solved by adjustment of the basic OFDM-structure for each transmitter/base station so that not utilized time between symbols will be negligible and the larger part of the transmitted power can be utilized by the terminals.

The invention relates to a communications system where at least some part of the transmission is executed by means of radio waves, and where symbols are transmitted by means of Orthogonal Frequency Divisional Multiplexing, so called OFDM-technology, between a transmitting unit and a receiving unit, at which the symbol transmission is executed over a transmission channel in blocks of binary digits with a guard interval GI between said blocks, where transmitting unit is equipped with means to control the length of the guard interval with regard to the physical conditions for/of the transmission channel.

BRIEF DESCRIPTION OF THE DRAWINGS

The invention will be described in more details in the following with reference to the enclosed drawings, of which.

DETAILED DESCRIPTION OF PREFERRED EMBODIMENTS

An OFDM-system is defined by certain basic parameters such as the number of FTT-points, the size of the so called guard interval GI, sampling speed, bandwidth etc. Several of these parameters are selected for the worst case, that is, for the most difficult possible communications condition in which the system shall be functioning satisfactorily. The guard interval means that power and time between OFDM-symbols are not utilized. The guard interval is decided for such a system so that all receivers shall have possibility to receive and detect symbols without intersymbol interference ISI occurring. The worst conceivable propagation delay in the radio channel therefore will be dimensioning for the length of the guard interval.

At normal use of a communications system, however, there sometimes will be considerably better conditions, which means that the parameters which have been selected at the design/construction of the system are too resource exacting because they are not adjusted to at present existing conditions. The inventors have realized that, by adequate measures, it will be possible to, by reducing the guard interval from ¼ to ⅛, ¹⁄₁₆, and ¹⁄₃₂, increase the system capacity correspondingly. In a system for distribution "one-to-many" (point-to-multipoint), however, it is not practical to change the guard interval GI for each separate receiver because all OFDM-symbols are transmitted to all receivers within the coverage area.

One of the ideas behind the invention includes to by, in access points AP or base stations BS in a communications system, designing/constructing the OFDM-transmitter in such a way that the guard interval GI can be adjusted as an installation parameter, the guard interval of the OFDM-signal can be adjusted to existing channel conditions from the transmitter within each separate coverage area, also called cell. When a new receiver is connected in this cell, it will be possible to, for instance, via an adjustment algorithm, for instance such as is described by Kim et al, "Frame Selection Algorithm with Adaptive FFT input for OFDM Systems", at ICC, the International Chamber of Commerce 2002, automatically change to the guard interval selection of this cell.

Figure 1A:
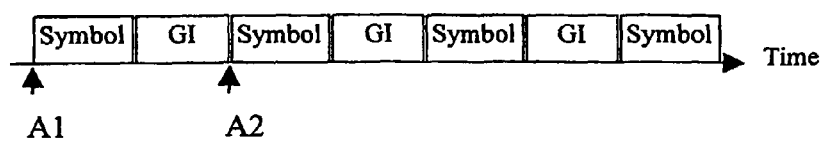
FIG. 1a shows symbol start points of time and guard intervals in a symbol transmission sequence.

The algorithm is functioning in such a way that it identifies where the OFDM-symbol really starts, that is, estimates how wide/large guard interval that is used. In FIG. 1a consequently is visualized that the algorithm identifies the occasions which have been marked with arrows A1, A2, B1, B2 at the time axis, that is, where OFDM-symbols start. The figure includes examples of two different places, Place 1 and Place 2, where on the one hand a long and on the other a short guard interval is used. By the algorithm, which is built-in in receiving unit, here called the terminal, identifying where the OFDM-symbol starts, the guard interval can be selected by the operator based on what each specific cell looks like, without any setting needed to be changed in the terminal when the terminal is roved between different cells. In other words, the algorithm executes frame synchronization by in receiving unit calculating an estimate of the guard interval GI by using the in the time domain received signals, and by calculating an estimate of the difference between received and expected frame start time, the so called "coarse framing offset", $\hat{\delta}_{int}$ expressed as $$\hat{\delta}_{int} = \arg\min_{n}\left\{\frac{1}{G}\sum_{l=0}^{G-1}||y_{i,l+n}|^2 - |y_{i,l+n+N}|^2|\right\}$$

where n=0, 1, 2 ..., 2G+2N−1 and G indicating the sample length at the guard interval.

Figure 1A:
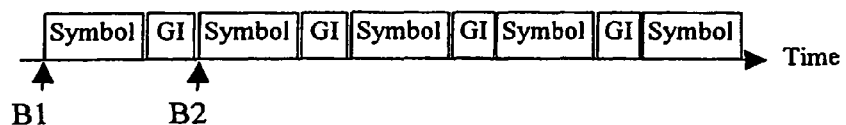
Figure 1B:
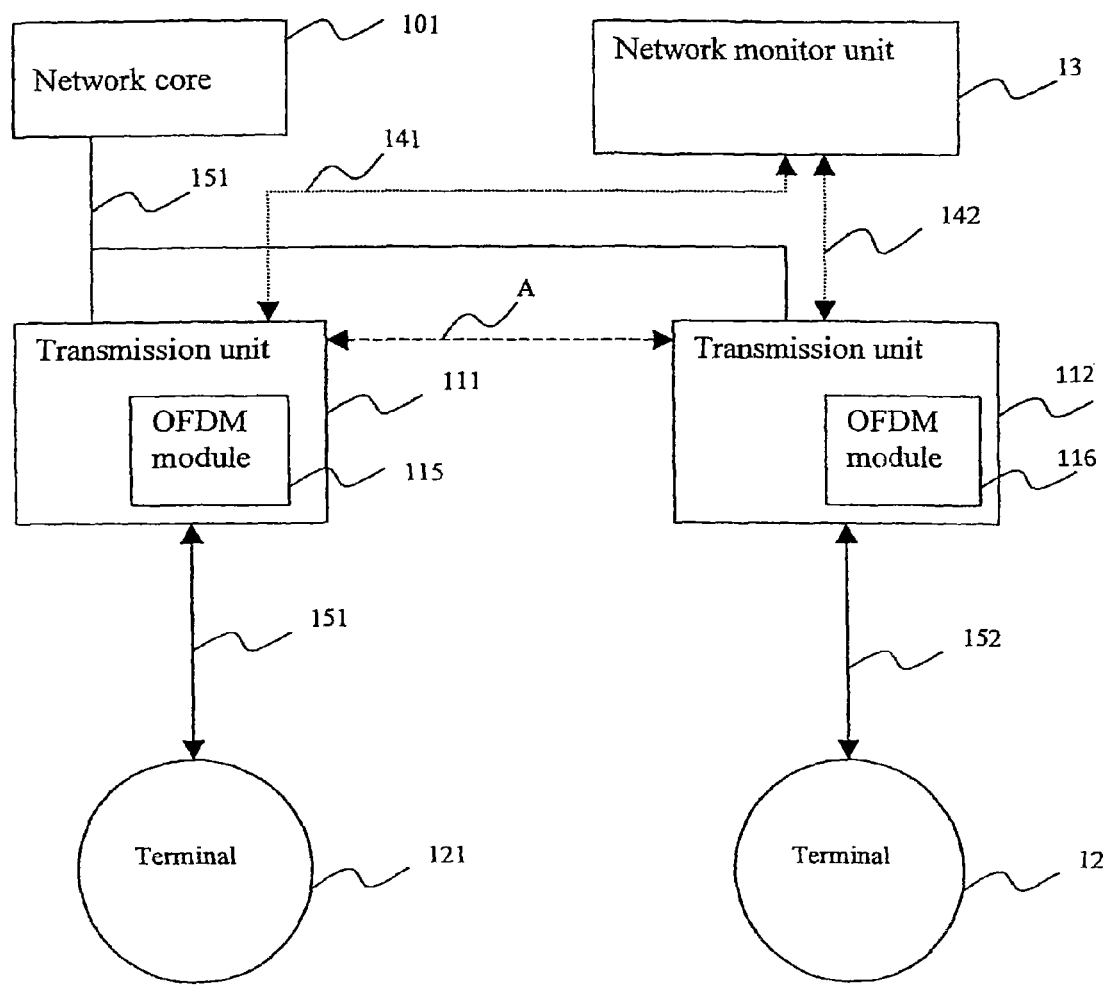
FIG. 1b shows a block diagram over a system solution comprising guard interval adjustment according to one embodiment of the present invention.
Figure 2:
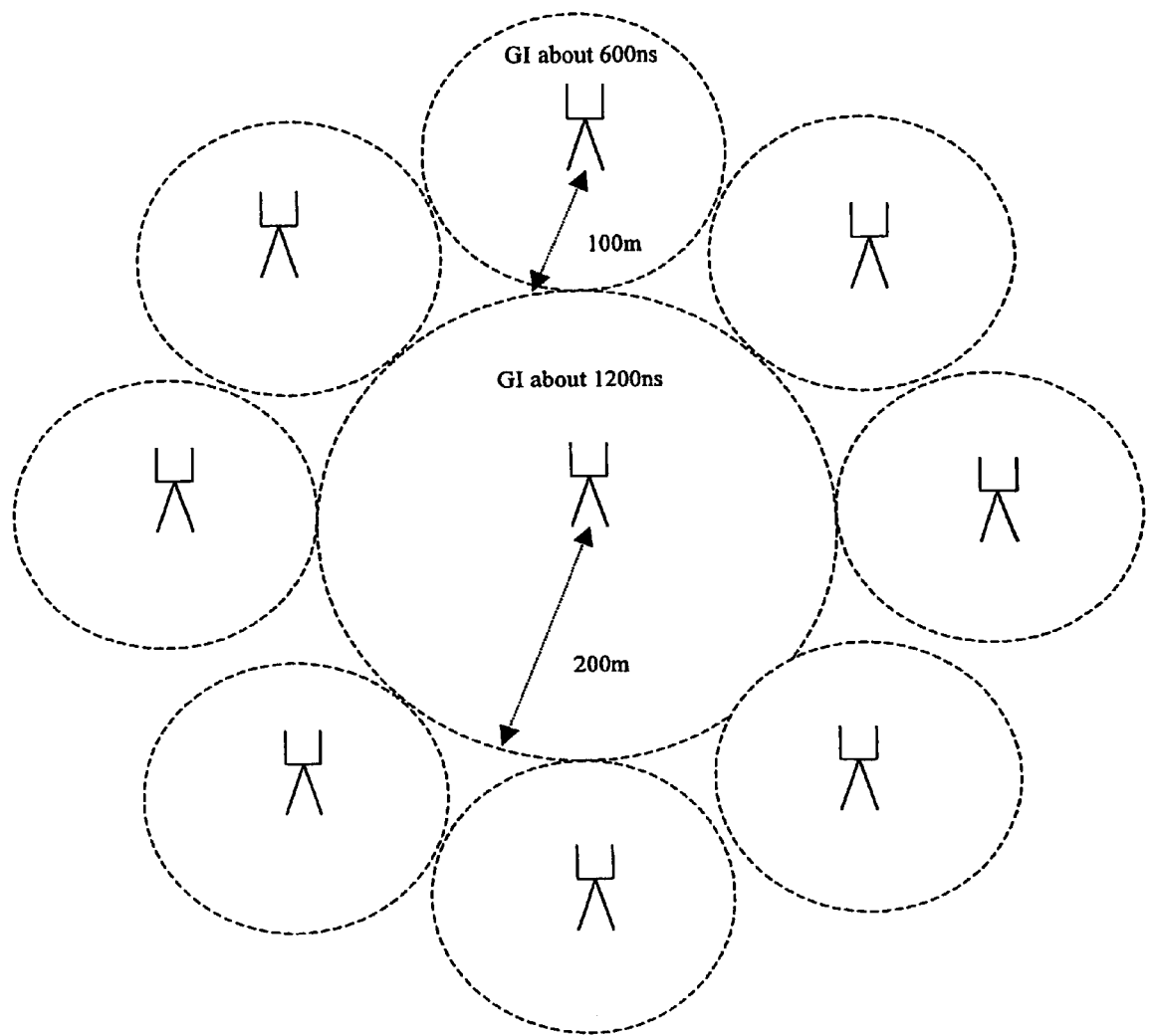
FIG. 2 shows geographical distribution of cells and to that associated guard interval.

The guard interval GI then can, as indicated above, in a flexible way be adjusted to/for each cell in the communications system, and the capacity/throughput can be improved in the system. This is illustrated in FIG. 1. A communications system consists of a network core 101 which via a connection 151 is in connection with two adjacent/nearby located transmission units 111, 112. The physical distance between the transmission units 111, 112 is α. Each transmission unit has, via ether communications 151, 152, contact with at least one terminal 121, 122. A network monitor unit 131 monitors the system and handles system parameters. The network monitor unit 131, together with the OFDM-modules 115, 116, attends to that the guard interval GI is adjusted to the distance α between the transmission units in such a way that the guard interval is adjusted to the cell radius. Suitable guard interval parameter GI is applied to/in OFDM-module 115, 116, and further respective terminal 121, 122 is arranged to adjust itself to the guard interval GI of the cell. The guard interval GI should be selected so that it corresponds to the maximum time dispersion a received signal can experience in respective coverage area. For instance, if there in a cellular system is about 100 m cell radius, the distance for a reflected signal can be up to about 200 m. The flexible guard interval GI consequently is adjusted to handle the delay 200 m, which corresponds to a guard interval GI of about 600 ns. For a cell with a radius of 200 m, about 1200 ns is selected, that is, so that the length of the guard interval in nanoseconds is set to, on the whole, six times the cell radius in meters. The principle for selection of size of the guard interval GI is illustrated in FIG. 2.

In one preferred embodiment, the parameter GI can be preset by the operator or the system administrator via the ordinary interfaces for setting/adjustment of a radio channel, modulation etc in each access point AP and each base station BS. Setting of the parameter guard interval GI by/from a centrally located administrator, operator or separate user results in that one continuously achieves optimal performance without need to change hardware at the place of respective access point AP or base station BS. The invention by that includes the possibility to improve capacity performance for an OFDM-system both initially and when the system is extended by more access points AP or base stations BS.

In a cellular two-way communications system based on OFDM and according to one embodiment of the invention, consequently a flexible adjustment of the guard interval GI is achieved. Said guard interval GI is adjusted to the existing transmission conditions in each cell. In another embodiment, each terminal 121, 122 is equipped with an automatic adjustment unit 310 which automatically adjusts the guard interval GI in the cell of current interest so that mobile units can move in the cellular system and adjust their reception to the flexible parameter selections of the different cells.

In tests an OFDM-system according to one embodiment of the invention and based on IEEE 802.11a has been tested and verified in indoor environment. In these comparatively small cells with maximum distances of about 50 m between transmitter and receiver, no symbol errors due to time dispersion of the channel have been measured. The standardized guard interval for OFDM in IEEE 802.11a is 800 ns, which by use of one embodiment of the present invention should be possible to reduce to 400 ns in most indoor environments.

Figure 3:
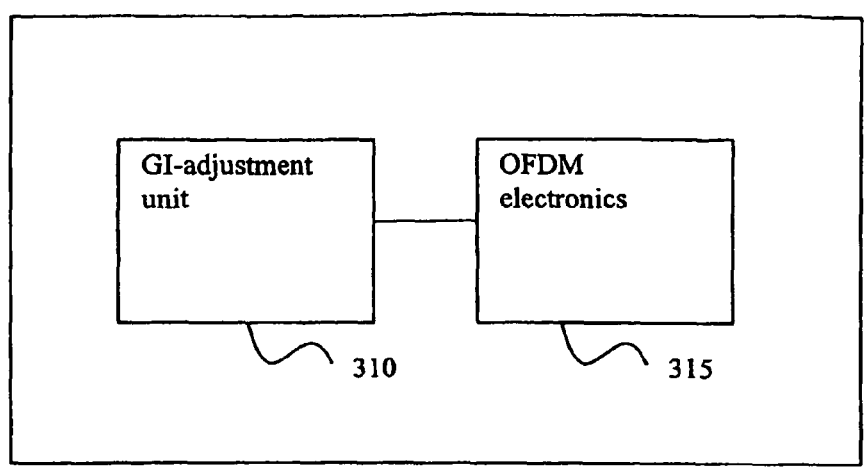
FIG. 3 shows a block diagram over a two-way communications system where the guard interval adjustment is based on current channel estimate from a WCDMA-receiver.

In FIG. 3 a structure for/of the OFDM-module 115, 116 according to FIG. 1 is described. An automatic guard interval adjustment unit 310 is in connection with other electronics 315 for execution of OFDM. The guard interval adjustment unit 310 calculates the under the circumstances best guard interval and transmits this to other electronics 315 for execution of OFDM.

In one preferred embodiment, the guard interval is adjusted according to longest delay in the impulse response. Because the delay, however, maximally can be about the time it takes for the signal to travel twice the cell radius, this value can be supposed to be a suitable guard interval, that is (distance between base stations)/(3*18$^8$). As a rule of thumb, it can be assumed that radio waves travel 300 m in 1 microsecond, and if there is this distance between BS, and consequently 150 m max. between BS and terminal, the guard interval should be 1 microsecond in this typical example in city environment. For BS in suburb with 1 km between BS, one should have 3 microseconds guard interval.

It is not necessary to, in all situations, calculate the guard interval in an embodiment of the invention. The guard interval can be calculated before the base station is installed, for instance at the cell planning occasion, and after that only when changes in the network planning are made.

The guard interval consequently need not necessarily be calculated anywhere in the system. If one concentrates with more BS one can, via handling/managing system SNMP, reduce the guard interval with corresponding new shorter BS-distance so that more OFDM-symbols are transmitted within each time frame or block of symbols.

In yet another preferred embodiment there is in a receiver which receives the OFDM-signal a receiver adjustment module arranged which adjusts said receiver according to the current guard interval in the cell. Said adjustment is made by use of an adjustment algorithm described in "Frame Selection Algorithm with Adaptive FFT Input for OFDM Systems, ICC 2002", which has been described above.

Figure 4:
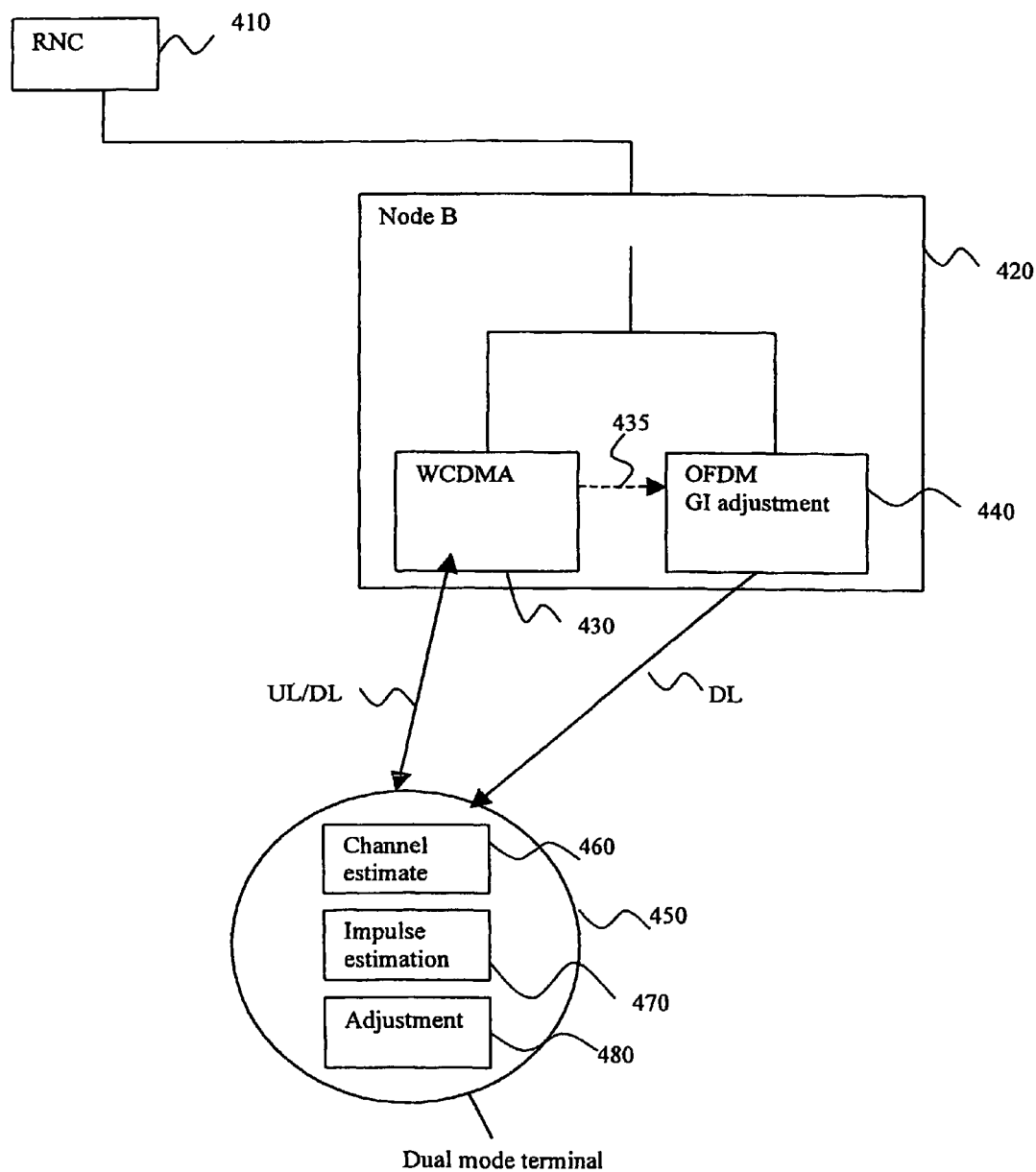
FIG. 4 shows a block diagram over a system solution according to another embodiment of the present invention.
Figure 5:
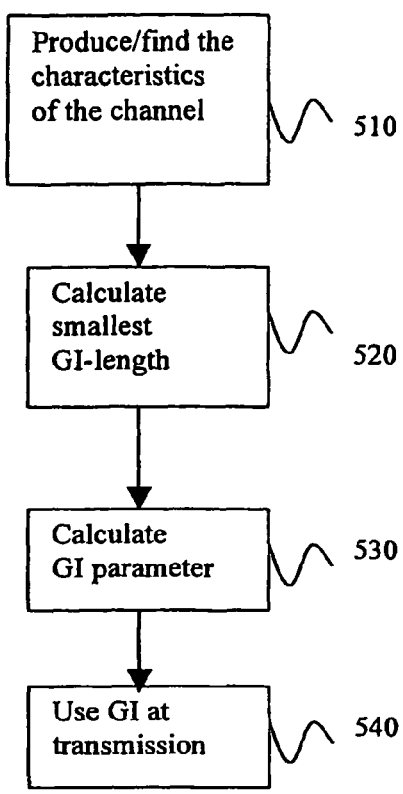
FIG. 5 shows a block diagram of a guard interval designed as a copy of the last symbols in each block and are also inserted first in each block before transmission.

In yet another embodiment of the present invention, an adjustable guard interval GI in a two-way communications system according to FIG. 4 is provided.

In a two-way communications system, where communication is executed both in an uplink UL and in a downlink NL, an adjustment of the parameters of the OFDM-signal can be made to existing communication conditions, which increases the capacity/throughput of the system. In order to receive a transmitted signal, an estimation of the qualities of the transmission channel is made. For instance, the delays and the changes of amplitude which occur between transmitter and receiver are measured. This so called channel information from the receivers of the system by that can be utilized for the generation of the signals in the OFDM-transmitter, where one, by knowing the impulse response of the channel, can adjust the guard interval GI of the OFDM-signal to existing channel conditions from the transmitter within each separate coverage area, and also for each terminal within the coverage area. The impulse response is produced in receiving unit by estimating the channel from a transmitted symbol in a so called "preamble". The principle is illustrated in FIG. 4, where the guard interval GI is adjusted based on current channel estimate from a WCDMA-receiver 430. The channel estimate is transmitted/transferred to the OFDM-unit 440 where the guard interval GI is adjusted on basis of current channel estimate.

A radio network control unit RNC is in (wire) connection with a number of nodes, one of which is node B.

The guard interval should be equal in up and down link; then in systems using TDD (Time Division Duplex), the up and downlink of the channel is identical, and the same guard interval should be used.

The system in FIG. 4 also includes a so called dual mode terminal 450, which is arranged to receive both OFDM- and WCDMA-signals. This terminal 450 includes a channel estimation unit 460 for production of channel estimates and an estimation unit 470 for estimation of impulse responses from WCDMA-training sequences. Said estimate and estimation then is used to adjust the guard interval OFDM in downlink.

In yet another preferred embodiment, the guard interval is designed as a copy of the last symbols in each block. These symbols are copied and are also inserted first in each block before transmission.

The invention claimed is:

1. A transmitting unit within a communications system where at least some part of the transmission is executed by radio waves and in cells, and where symbols are transmitted by Orthogonal Frequency Divisional Multiplexing, called OFDM-technology, between a transmitting unit and a receiving unit, at which the symbol transmission is executed over a transmission channel in blocks of binary digits and with a guard interval (GI) between the blocks, the transmitting unit comprising:
    circuitry configured to:
        determine a characteristic of a transmission channel between the transmitting unit and the receiving unit;
        determine a size of a cell in which the transmitting unit is located based on the determined characteristic of the channel;

determine a smallest possible guard interval length that causes intersymbol interference below a predetermined threshold value based on the determined size of the cell; and automatically adjust a length of the guard interval to be the smallest possible guard interval length.

2. The transmitting unit as claimed in claim 1, wherein
the circuitry is configured to automatically adjust the length of the guard interval by modifying an adjustable guard interval parameter.

3. The transmitting unit as claimed in claim 2, wherein the guard interval parameter can be changed via handling/managing system SNMP.

4. The transmitting unit as claimed in claim 2, wherein the length of the guard interval is adjusted to the size of the cell in such a way that the length of the guard interval in nanoseconds is set to six times the cell radius in meters.

5. The transmitting unit as claimed in claim 3, wherein
determining the characteristic of the transmission channel between the transmitting unit and the receiving unit includes determining an impulse response of the transmission channel.

6. A receiving unit within a communications system as claimed in claim 1, wherein
the receiving unit is equipped with an adjustment module which adjusts the receiving unit according to the current guard interval in the cell.

7. The receiving unit as claimed in claim 6, wherein the adjustment is made through/by an operator.

8. The receiving unit as claimed in claim 6, wherein
at the adjustment, an algorithm is used including:
estimation of received guard interval.

9. The receiving unit as claimed in claim 8, wherein
the estimation is made by calculating an estimate of the difference between received and expected block start point of time, called "coarse framing offset" $\delta_{int}$ according to the formula:

$$\hat{\delta}_{int} = \arg \min_{n} \left\{ \frac{1}{G} \sum_{l=0}^{G-1} ||y_{i,l+n}|^2 - |y_{i,l+n+N}|^2| \right\}$$

where n=0, 1, 2, . . . , 2G +2N −1 and G indicates the sample length at the guard interval and $y_1$ indicates the received signal of the i:th OFDM-symbol in the time domain.

10. A method within a communications system where at least some part of the transmission is executed by radio waves and in cells, and where symbols are transmitted by Orthogonal Frequency Divisional Multiplexing, called OFDM-technology, between a transmitting unit and a receiving unit, at which the transmission of symbols is executed over a transmission channel in blocks of binary digits with a guard interval (GI) between the blocks, the method comprising:

determining a characteristic of a transmission channel between the transmitting unit and the receiving unit;

determining a size of a cell in which the transmitting unit is located based on the determined characteristic of the channel;

determining a smallest possible guard interval length that causes intersymbol interference below a predetermined threshold value based on the determined size of the cell;

automatically adjusting the length a length of the a guard interval to be the smallest possible guard interval by adjusting a guard interval parameter; and incorporating and using the guard interval parameter at transmission of symbols from the transmitting unit.

11. The method as claimed in claim 10, wherein determining the characteristic of the transmission channel between the transmitting unit and the receiving unit includes determining an impulse response of the transmission channel.

12. The method as claimed in claim 10, further comprising:
estimating a received guard interval.

13. The method as claimed in claim 12, wherein the estimating is constituted by operator decided guard interval.

14. The method as claimed in claim 12, wherein the estimating is executed by calculating an estimate of the difference between received and expected block start point of time, called "coarse framing offset" $\delta_{int}$ according to the formula:

$$\hat{\delta}_{int} = \arg \min_{n} \left\{ \frac{1}{G} \sum_{l=0}^{G-1} ||y_{i,l+n}|^2 - |y_{i,l+n+N}|^2| \right\}$$

where n=0, 1, 2, . . . , 2G +2N −1 and G indicates the length of sample at the guard interval and $y_1$ indicates the received signal of the i:th OFDM-symbol in the time domain.

15. The method as claimed in claim 10, wherein the length of the guard interval is adjusted to the size of the cell in such a way that the length of the guard interval in nanoseconds is set to six times to the cell radius in meters.

* * * * *